United States Patent

[11] 3,632,306

| [72] | Inventors | John F. Villiers-Fisher<br>Kendall Park;<br>Abe Warshaw, Chesquake Village, both of N.J. |
|---|---|---|
| [21] | Appl. No. | 800,138 |
| [22] | Filed | Feb. 18, 1969 |
| [45] | Patented | Jan. 4, 1972 |
| [73] | Assignee | Chemical Construction Corporation<br>New York, N.Y. |

[54] REMOVAL OF SULFUR DIOXIDE FROM WASTE GASES
25 Claims, 1 Drawing Fig.

[52] U.S. Cl. ................................................. 23/2 SQ, 23/178 S
[51] Int. Cl. ........................................................ B01d 53/34, C01b 17/60
[50] Field of Search ........................................... 23/2, 178, 178 S

[56] References Cited
UNITED STATES PATENTS
1,212,199  1/1917  Eustis ........................... 23/178
2,031,802  2/1936  Tyrer ............................ 23/178
3,386,798  6/1968  Bevans et al. ................. 23/2

*Primary Examiner*—Earl C. Thomas
*Attorney*—J. L. Chaboty

ABSTRACT: Waste gases containing sulfur dioxide, which may also contain sulfur trioxide, are scrubbed with an aqueous slurry containing solid reactant particles of an oxide or carbonate of calcium, magnesium or barium, together with an additive containing an acidic radical which solubilizes the calcium, magnesium or barium ion, so that the aqueous slurry absorbs sulfur dioxide from the waste gas. The dissolved sulfur dioxide forms the soluble sulfite radical in solution, which reacts with the dissolved calcium, magnesium or barium ion to precipitate a solid sulfite and regenerate the additive in solution. The solid sulfite or calcium, magnesium or barium is separated from the aqueous liquid phase which is recycled for further scrubbing, together with makeup solid reactant particles. The scrubbed waste gas is discharged to atmosphere.

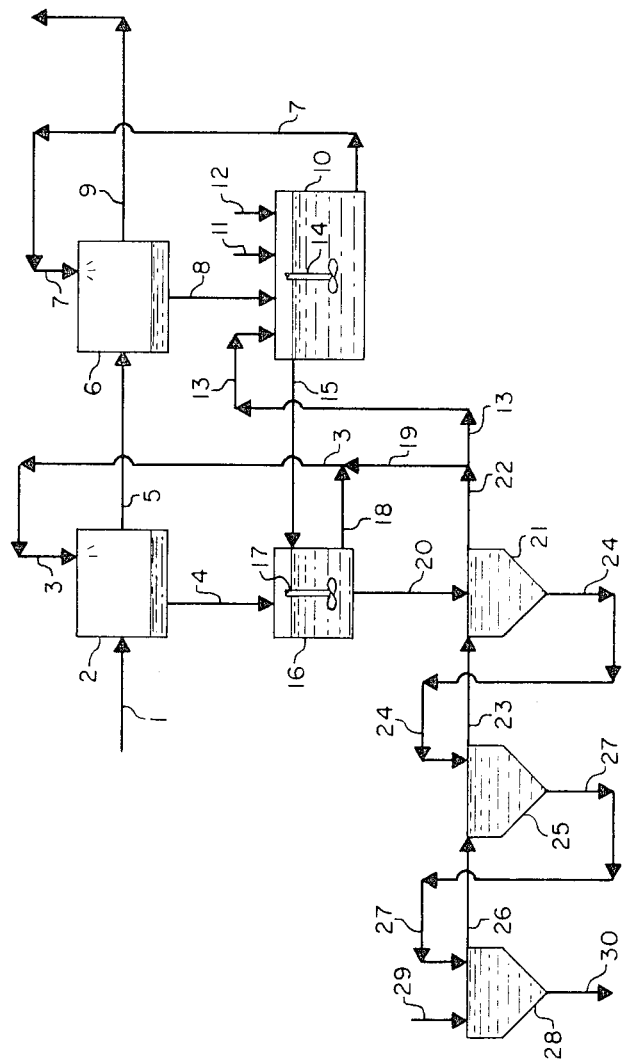
JOHN F. VILLIERS-FISHER
ABE WARSHAW
INVENTORS.
BY
AGENT

REMOVAL OF SULFUR DIOXIDE FROM WASTE GASES

BACKGROUND OF THE INVENTION

1. Field of the Invention

The invention relates to the removal of a sulfur dioxide contaminant from a waste gas stream, such as a flue gas derived from the combustion of a sulfur-containing carbonaceous or hydrocarbon fuel, or the tail gas from a sulfuric acid production process, before the waste gas stream is released to the atmosphere, so as to prevent air pollution and recover sulfur dioxide in the form of a solid sulfite. Thus, the invention is particularly applicable to the removal of sulfur dioxide from the waste gases of power plants, steam generators, space heating boilers and chemical plants such as sulfuric acid production facilities and organic sulfonation processes.

2. Description of the Prior Art

Numerous procedures and systems have been proposed or developed for the removal of sulfur oxides and principally sulfur dioxide, from a waste gas stream such as flue gas, and for the recovery of the sulfur dioxide as a solid byproduct or in aqueous solution. Many prior art procedures employ alkaline solutions for this purpose. The use of lime, milk of lime or limestone for this process has been proposed in British Pat. Nos. 360,127; 365,090 and 374,467. The U.S. Pat. Nos. 1,908,731; 2,031,802; 2,086,379 and 2,142,987 are also pertinent.

SUMMARY OF THE INVENTION

In the present invention, a secondary reagent is added to an oxide or carbonate slurry scrubbing system for wet scrubbing of a flue gas or the like containing sulfur dioxide. Oxides or carbonates of calcium, magnesium or barium or their mixtures may be employed. The secondary reagent increases the solubility of the calcium or other alkaline ion and increases the available alkali content in solution, so that the rate of absorption of the sulfur dioxide is greatly increased. Optimum efficiency is obtainable by multistaging or at specific secondary reagent concentrations. The novel feature is the use of cheap, readily recoverable additives in an alkaline oxide or carbonate slurry scrubbing system for sulfur dioxide removal from waste gas streams. The additives greatly improve the system performance. A typical additive is acetic acid. The basic chemistry of the use of acetic acid entails the reaction of the dissolved acetic acid with solid calcium carbonate, calcium oxide or calcium hydroxide formed by calcium oxide hydrolysis, or with the oxides or carbonates of magnesium or barium to yield an acetate in solution. The dissolved alkaline earth or metal ion in solution is highly reactive and readily available, compared to the initial calcium, magnesium or barium compound. The acetate compound in solution readily reacts with dissolved sulfurous acid formed by the absorption of sulfur dioxide into the aqueous slurry, to form precipitated solid calcium, magnesium or barium sulfite and regenerated acetic acid. The solid sulfite is washed, preferably in a countercurrent multistage washer-thickener, to recover an aqueous solution containing the acetate values, generally as calcium magnesium or barium acetate, which is recycled to the waste gas scrubbing step. Any acid intermediate in strength between carbonic acid and sulfurous acid and whose respective calcium, magnesium or barium salt is reasonably soluble may be employed. A reasonable minimum salt solubility is about 0.1 percent by weight in the aqueous slurry.

An acid salt may also be employed to dissolve the solid reactant particles of oxide or carbonate of calcium, magnesium or barium. Thus for example, use of ammonium chloride as the additive reagent would result in reaction between solid calcium carbonate, for example, and the added ammonium chloride to form dissolved calcium chloride and ammonium carbonate in solution. The ammonium carbonate reacts with sulfurous acid to form ammonium sulfite, which in turn reacts with calcium chloride to yield precipitated solid calcium sulfite and regenerated ammonium chloride. The resulting sludge or slurry is washed to recover soluble ammonium chloride which is recycled, and the washed solid calcium sulfite sludge is passed to disposal. Other acid salts such as ammonium nitrate may also be employed in the process. The usage of an acid salt results in relatively low solubility of the resulting calcium, magnesium or barium salt in the aqueous liquor containing dissolved acid salt.

The solid sulfite produced in either case may be passed to waste disposal, or this material may be dried and calcined to yield a gas stream rich in sulfur dioxide and regenerated calcium, magnesium or barium oxide, which may be recycled to the waste gas scrubbing process as a component of the aqueous slurry. The sulfur dioxide-rich gas may be processed to recover liquid sulfur dioxide product, or may be passed to a sulfuric acid production facility for conversion to sulfuric acid.

The invention is particularly applicable to gas purification and pollution control by removal of sulfur dioxide from stack gases, by the absorption of sulfur dioxide in a slurry of limestone or calcium oxide and water, in equipment such as spray towers, wet scrubbers and packed towers. The invention is particularly applicable to pollution control devices such as wet scrubbers for scrubbing flue gas, where both dust or fly ash and sulfur oxides are to be removed. High sulfur oxide removals can be obtained using limestone, which is the cheapest available alkali, in these low contact time devices. Calcium oxide in the form of quicklime, or slaked lime or calcium hydroxide, may also be employed.

The process of the present invention provides important advantages. Increasing the dissolved reagent concentration permits removal of sulfur dioxide from the gas using greatly reduced contact areas and/or time, since the solution of the sulfur dioxide is controlled by diffusion in the liquid phase. The solubility of limestone, the cheapest and most common alkali, is negligible. Consequently, if the additives of the present invention are not employed, the acid gas must diffuse through the liquid to the solid particles, which is a slow process. Countercurrent packed towers with low gas velocities are the normal means of removing sulfur dioxide with limestone slurries. However, by introducing the additive of the present invention, the limestone solubility with respect to dissolved calcium ion is increased to the point where all the sulfur dioxide in the gas would be completely reacted with the reagent in the surface layer of the liquid. The efficiencies, therefore, improve enormously. By practice of the present invention, it is possible to scrub out substantially all the sulfur dioxide in a wet scrubber or a cocurrent spray tower using the limestone or calcium oxide as the alkali. This is a major economic improvement in system performance, where sulfur dioxide removal is important. In addition, the additives are readily recoverable in accordance with the present invention, and are relatively inexpensive.

It is an object of the present invention to remove sulfur dioxide from waste gases in an improved manner.

Another object is to provide an improved process for the removal of sulfur dioxide from waste gases using an aqueous slurry containing oxides or carbonates of magnesium or barium, limestone or calcium oxide.

A further object is to solubilize limestone, calcium oxide or magnesium oxide for use in an aqueous slurry which is employed to remove sulfur dioxide from waste gases as solid calcium sulfite or magnesium sulfite.

An additional object is to employ an additive reagent to solubilize calcium ion in aqueous limestone or calcium oxide slurry systems for scrubbing sulfur dioxide from waste gases.

These and other objects and advantages of the present invention will become evident from the description which follows.

DESCRIPTION OF THE DRAWING AND PREFERRED EMBODIMENTS

Referring now to the drawing, a flowsheet of a preferred embodiment of the invention is presented. Waste gas stream 1 is typically a flue gas derived from the combustion of a sulfur-containing carbonaceous or hydrocarbon fuel in a steam power boiler or the like, and stream 1 is typically obtained at a temperature in the range of 100°C. to 300 °C. and contains in the range of about 0.01 percent to about 1 percent sulfur dioxide content, together with entrained solid fly ash. In other instances, stream 1 may be derived as the tail gas from a sulfuric acid production facility. In any case, stream 1 is passed into spray scrubbing tower 2, which may be any suitable gas-slurry contact apparatus or device, and stream 1 is contacted in tower 2 with aqueous scrubbing slurry stream 3, which is a liquid slurry containing a finely divided solid oxide or carbonate of calcium, magnesium or barium, which in this case is calcium-containing component consisting of calcium carbonate or calcium oxide or a mixture of both. As will appear infra, the calcium carbonate may be derived from powdered limestone, dolomitic limestone, or the like, and the alternative calcium oxide may actually be present to some extent as hydrated calcium hydroxide or slaked lime. Stream 3 also contains an additive which provides a radical that forms a soluble salt with calcium ion, which subsequently precipitates as solid calcium sulfite when sulfur dioxide is absorbed into the liquid slurry. The additive, when powdered limestone is present in stream 3, will consist of an acid having a strength or ionization potential between carbonic acid and sulfurous acid, or a comparable acid salt. For purposes of process description, the slurry stream 3 will be described as consisting of an aqueous slurry of powdered limestone containing acetic acid as an additive. Thus, stream 3 will contain a proportion of solubilized calcium ion as calcium acetate in solution.

Stream 3 contacts waste gas stream 1 within unit 2, and sulfur dioxide is absorbed from the gas phase into the liquid phase. The absorbed sulfur dioxide forms sulfurous acid in the aqueous solution within unit 2, which in turn reacts with dissolved calcium acetate to precipitate solid calcium sulfite and regenerate acetic acid in solution. The reaction of sulfurous acid with calcium acetate, as well as the further formation of calcium acetate in solution by reaction of acetic acid with solid powdered limestone, usually require a time interval for completion, and consequently the spent scrubbing slurry stream 4 containing dissolved sulfur dioxide is usually passed to a retention or hold tank, as will appear infra. Most of the fly ash or other entrained solid particles originally present in stream 1 will also be removed via stream 4.

The resulting scrubbed gas stream 5 discharged from unit 2 now contains a reduced proportion of sulfur dioxide and in most cases a major portion of the sulfur dioxide originally present in stream 1 will be removed in unit 2. In this embodiment of the invention, stream 5 is further scrubbed to remove most of the residual sulfur dioxide, by passing stream 5 into scrubbing tower 6, which is generally similar in configuration to unit 2. Aqueous scrubbing slurry 7, containing powdered limestone and acetic acid in solution, is passed into unit 6 and contacts stream 5, thereby dissolving most of the residual sulfur dioxide into the liquid phase, and also entraining solid fly ash particles into the liquid phase. The resultant spent scrubbing slurry stream 8, containing dissolved sulfur dioxide in the form of sulfurous acid, is passed to a hold tank, as will appear infra, for retention over a time interval to permit desired reactions to take place, as described supra. The scrubbed waste gas stream 9 discharged from unit 6 is now substantially free of sulfur dioxide, and stream 9 may be safely discharged to atmosphere without causing air pollution.

Stream 8 is passed from unit 6 to hold and makeup addition tank 10, which also receives makeup powdered limestone stream 11 and makeup acetic acid stream 12, as well as recycle aqueous solution stream 13, produced as will appear infra. Streams 8, 11, 12 and 13 are mixed in retention tank 10 by agitator 14, and the several streams are blended into a uniform slurry while reaction of sulfurous acid derived from stream 8 with calcium acetate takes place, to form precipitated solid calcium sulfite and regenerated acetic acid, as well as reaction of acetic acid with a portion of the powdered limestone feed stream 11 to form calcium acetate in solution. A portion of the resulting uniform aqueous slurry, principally containing solid particulate limestone and acetic acid, is recycled via stream 7 for further gas scrubbing in unit 6.

The balance of the uniform slurry produced in unit 10 is passed via stream 15 to hold tank 16, in which stream 15 is mixed and reacted with stream 4 in accordance with the reactions described supra, which form insoluble solid calcium sulfite by reaction of dissolved calcium acetate with sulfurous acid, with concomitant regeneration of acetic acid which further reacts with solid powdered limestone or calcium carbonate in the slurry to form further calcium acetate. Retention tank 16 is provided with agitator 17, to insure complete mixing and reaction during a time interval in unit 16. Most of the resulting uniform slurry produced in unit 16 is withdrawn via stream 18, which is combined with aqueous recycle solution stream 19 to form stream 3, which is now employed for further waste gas scrubbing in unit 2 as described supra.

A bleed slurry stream 20 containing precipitated solid calcium sulfite, residual powdered limestone, acetic acid and calcium acetate is also withdrawn from unit 16 and stream 20 is further processed in accordance with the present invention to produce a solid sludge containing calcium sulfite and to recover acetate values. Stream 20 is passed into first stage washer-thickness 21, and overflow clear aqueous liquid stream 22 derived from unit 21 and containing recovered acetate values in solution, in the form of calcium acetate, is divided into streams 13 and 19 which are recycled to the process as described supra. Aqueous washing liquor stream 23 is passed into unit 21 and serves to wash acetate values from the solids component, which consists primarily of calcium sulfite. In some cases the solids component in unit 21 will also contain a minor residual proportion of calcium carbonate or limestone. In any case, the washed solids component is removed from unit 21 via stream 24, which is passed to solids washer 25 for further washing with aqueous washing liquor stream 26, to recover residual acetate values. The clear liquor produced by unit 25 and containing residual acetate in solution is passed from unit 25 to unit 21 via stream 23, while the further washed solids component is removed from unit 25 via stream 27, which is passed to the final washer-thickener unit 28. Makeup water for the system is passed into unit 28 via stream 29, and provides a final washing for the solids stream 27. The overflow clear liquor thus produced is passed from unit 28 to unit 25 via stream 26, while the fully washed solids component, now consisting primarily of calcium sulfite sludge, is removed from unit 28 via stream 30, which is passed to waste disposal. In some cases stream 30, which consists primarily of wet calcium sulfite sludge, may be processed to recover valuable products. Thus, stream 30 may be dried and calcined, to produce solid calcium oxide for recycle to unit 10 and an off-gas rich in sulfur dioxide. The off-gas may be cooled to condense product liquid sulfur dioxide, or the off-gas may be passed to a sulfuric acid production facility for conversion to product sulfuric acid. It will be appreciated that stream 30 will also contain entrained solids such as solid fly ash derived from stream 1, in instances such as when stream 1 is a flue gas stream containing fly ash and derived from the combustion of a sulfur-containing solid carbonaceous or hydrocarbon fuel. In any case, entrained solid particles present in stream 1 will be removed from the system via stream 30. In addition, if stream 1 also contains sulfur trioxide, this component will also be removed via stream 30 as calcium sulfate.

Numerous alternatives within the scope of the present invention, besides those mentioned supra, will occur to those skilled in the art. A single stage of waste gas scrubbing may be provided in some cases, in which case units 6 and 10 would be omitted, with stream 5 being discharged to atmosphere and streams 11 and 12 passing into unit 16. In this case, all of stream 22 would be recycled via stream 19. More than two stages of waste gas scrubbing may also be provided in practice. Units 2 and 6 may consist of any suitable means for contact of the waste gas stream with an aqueous slurry, such as an open spray tower, a tower provided with a bed of suitable packing such as spheres, rings or saddles or the like, or in some cases units 2 and 6 may consist of venturi scrubbers. Depending on the relative activity of streams 11 and 12, the time interval of holdup of the streams in reaction tanks 10 and 16 may be minimal, and the streams may merely be mixed in units 10 and 16 and immediately discharged, however in most cases a holdup time interval in the range of about 0.5 minutes to 10 minutes will be provided in units 10 and 16.

Stream 11 may consist of calcium carbonate, either in the purified form or as powdered limestone or dolomitic limestone. When stream 11 consists of calcium carbonate in any of these various forms, stream 12 will contain the acidic radical of an acid intermediate in strength between carbonic acid and sulfurous acid. In other cases, stream 11 may consist of calcium oxide, either as quicklime or in the hydrated form as slaked lime or an aqueous slurry containing calcium oxide and calcium hydroxide. It will be understood that within the context of the present invention, the term calcium oxide includes not only quicklime but also the hydrated forms of calcium oxide such as slaked lime and the like. Stream 11 may alternatively consist of the oxide or carbonate of magnesium or barium, and in the case of an oxide the solid reactant will generally be present to some extent in the hydrated state as a hydroxide.

Stream 12 may consist of a free acid, such as formic acid, acetic acid, propionic acid or the like. In other instances, stream 12 may consist of an acidic salt or a salt which provides an acidic pH in aqueous solution, such as ammonium chloride, ammonium nitrate or the like.

The optimum flow rates of streams 11 and 12 will be empirically determined in practice, depending on the compositions of streams 11 and 12 and the relative activity of stream 11, which depends in most cases on the physical form and prior processing of stream 11. In most cases, stream 12 will be added in a proportion such that dissolved acidic radical is present in streams 3 and 7 in a proportion in the range of about 0.1 percent to about 5.0 percent by weight.

The processing in washer-thickener units 21, 25 and 28 may alternatively be carried out in a single unit, rather than a plurality of countercurrent washers, or two or more than 3 units may be employed in practice. In some cases, depending on the composition and relative value of stream 12 and the form of the precipitated solids in stream 20, the aqueous slurry stream 20 may merely be passed to a liquid-solid separator such as a vacuum drum filter, with the filtered clear liquor phase being recycled via streams 13 and 19 and the solids component being passed to disposal similar to stream 30.

Following is an example of development-scale pilot plant testing of the process of the invention.

EXAMPLE

The present invention was tested in a lab scale spray tower facility using powdered limestone (−325 mesh) in an aqueous slurry as the scrubbing medium. Following is data relative to representative runs without an additive, and with typical additives in the aqueous slurry.

TABLE I.—TEST RESULTS

| Run number | 1 | 2 | 3 |
|---|---|---|---|
| Percent limestone in slurry | 5 | 2 | 2 |
| Additive in slurry | None | (1) | (2) |
| Percent additive in slurry | 0 | 8 | 1 |
| Gas flow, standard cubic meters per minute | 0.595 | 0.595 | 0.68 |
| Initial sulfur dioxide, percent by vol | 0.17 | 0.18 | 0.185 |
| Final sulfur dioxide, percent by vol | 0.060 | 0.038 | 0.032 |
| Scrubbing efficiency, percent | 65 | 79 | 83 |

1 Ammonium chloride.
2 Acetic acid.

TABLE II.—OPERATING DATA

| Run number | 1 | 2 | 3 |
|---|---|---|---|
| Relative liquid/gas flow rate 1 | 5,350 | 6,290 | 5,350 |
| Scrubber pressure drop, inches water | 15.2 | 15.2 | 15.2 |
| Drop residence time, seconds | 0.79 | 0.79 | 0.77 |
| Slurry pH | 6.2 | 6.0 | 4.8 |

1 Liters slurry/1,000 standard cubic meters gas/minute (at 20° C., 1 atm.).

We claim:

1. A process for the removal of sulfur dioxide from a waste gas stream containing sulfur dioxide which comprises scrubbing said waste gas stream with an aqueous slurry containing a solid particulate alkaline compound reactant selected from the group consisting of calcium oxide, calcium carbonate, magnesium oxide, magnesium carbonate, barium oxide and barium carbonate, said aqueous slurry containing a small but effective amount of dissolved acidic radical, said dissolved acidic radical being the radical of an acid intermediate in strength between carbonic acid and sulfurous acid, whereby the salt of said acidic radical with the alkaline ion of said reactant is soluble in said aqueous slurry and alkaline ion is dissolved in said aqueous slurry to form an alkaline salt of said acidic radical in aqueous solution, said alkaline salt reacting with a soluble compound formed by the dissolving of sulfur dioxide into said aqueous slurry, said soluble compound containing a sulfite radical, to form a precipitated solid sulfite and regenerated dissolved acidic radical, separating said solid sulfite from the aqueous liquid phase, adding makeup solid particulate reactant to said aqueous liquid phase, and recycling the resulting aqueous slurry for further scrubbing of said waste gas stream.

2. The process of claim 1, in which said solid particulate reactant is in the form of powdered limestone.

3. The process of claim 1, in which said waste gas stream is a flue gas stream generated by the combustion of a sulfur-containing fuel.

4. The process of claim 1, in which said dissolved acidic radical is derived from a free acid dissolved in said aqueous slurry.

5. The process of claim 4, in which said free acid is selected from the group consisting of formic acid, acetic acid and propionic acid.

6. The process of claim 1, in which said dissolved acidic radical is derived from an acidic salt dissolved in said aqueous slurry.

7. The process of claim 6, in which said acidic salt is selected from the group consisting of ammonium chloride and ammonium nitrate.

8. The process of claim 1, in which said dissolved acidic radical is present in said aqueous slurry in a proportion in the range of about 0.1 percent to about 5.0 percent by weight.

9. A process for the removal of sulfur dioxide from a waste gas stream containing sulfur dioxide which comprises scrubbing said waste gas stream with an aqueous slurry containing a solid particulate reactant selected from the group consisting of calcium oxide and calcium carbonate, whereby sulfur dioxide is dissolved in said aqueous slurry, said aqueous slurry containing a small but effective amount of dissolved acidic radical, said dissolved acidic radical being the radical of an acid intermediate in strength between carbonic acid and sulfurous acid, whereby the calcium salt of said acidic radical is soluble in said aqueous slurry and calcium ion is dissolved in said aqueous slurry to form the calcium salt of said acidic radical in aqueous solution, agitating the resulting aqueous slurry containing dissolved sulfur dioxide for a time interval, whereby said calcium salt reacts with a soluble compound formed by dissolving of sulfur dioxide into said aqueous slurry, said soluble compound containing a sulfite radical, to form a precipitated solid calcium sulfite and regenerated dissolved acidic radical, separating said solid calcium sulfite from the aqueous liquid phase, adding makeup solid particulate reactant to said aqueous liquid phase, and recycling the resulting aqueous slurry for further scrubbing of said waste gas stream.

10. The process of claim 9, in which said solid particulate reactant is in the form of powdered limestone.

11. The process of claim 9, in which said waste gas stream is a flue gas stream generated by the combustion of a sulfur-containing fuel.

12. The process of claim 9, in which said dissolved acidic radical is derived from a free acid dissolved in said aqueous slurry.

13. The process of claim 12, in which said free acid is selected from the group consisting of formic acid, acetic acid and propionic acid.

14. The process of claim 9, in which said dissolved acidic radical is derived from an acidic salt dissolved in said aqueous slurry.

15. The process of claim 14, in which said acidic salt is selected from the group consisting of ammonium chloride and ammonium nitrate.

16. The process of claim 9, in which said dissolved acidic radical is present in said aqueous slurry in a proportion in the range of about 0.1 percent to about 5.0 percent by weight.

17. The process of claim 9, in which said time interval is in the range of about 0.5 minutes to 10 minutes.

18. A process for the removal of sulfur dioxide from a waste gas stream containing sulfur dioxide which comprises scrubbing said waste gas stream with an aqueous slurry containing a solid particulate reactant selected from the group consisting of calcium oxide and calcium carbonate, said aqueous slurry containing a small but effective amount of dissolved acidic radical, said dissolved acidic radical being the radical of an acid intermediate in strength between carbonic acid and sulfurous acid, whereby the calcium salt of said acidic radical is soluble in said aqueous slurry and calcium ion is dissolved in said aqueous slurry to form the calcium salt of said acidic radical in aqueous solution, said calcium salt reacting with a soluble compound formed by the dissolving of sulfur dioxide into said aqueous slurry, said soluble compound containing a sulfite radical, to form precipitated solid calcium sulfite and regenerated dissolved acidic radical, separating wetted solid particles containing calcium sulfite from the aqueous liquid phase, washing said solid particles with water to remove soluble components containing said acidic radical, adding the resulting wash water to said aqueous liquid phase, adding makeup solid particulate reactant to said aqueous liquid phase, and recycling the resulting aqueous slurry for further scrubbing of said waste gas stream.

19. The process of claim 18, in which said solid particulate reactant is in the form of powdered limestone.

20. The process of claim 18, in which said waste gas stream is a flue gas stream generated by the combustion of a sulfur-containing fuel.

21. The process of claim 18, in which said dissolved acidic radical is derived from a free acid dissolved in said aqueous slurry.

22. The process of claim 21, in which said free acid is selected from the group consisting of formic acid, acetic acid and propionic acid.

23. The process of claim 18, in which said dissolved acidic radical is derived from an acidic salt dissolved in said aqueous slurry.

24. The process of claim 23, in which said acidic salt is selected from the group consisting of ammonium chloride and ammonium nitrate.

25. The process of claim 18, in which said dissolved acidic radical is present in said aqueous slurry in a proportion in the range of about 0.1 percent to about 5.0 percent by weight.

* * * * *